June 10, 1958 N. B. CHRISTENSEN 2,838,260
WING MOUNT WITH FLOATING CENTER SECTION
Filed Aug. 6, 1953 2 Sheets-Sheet 1
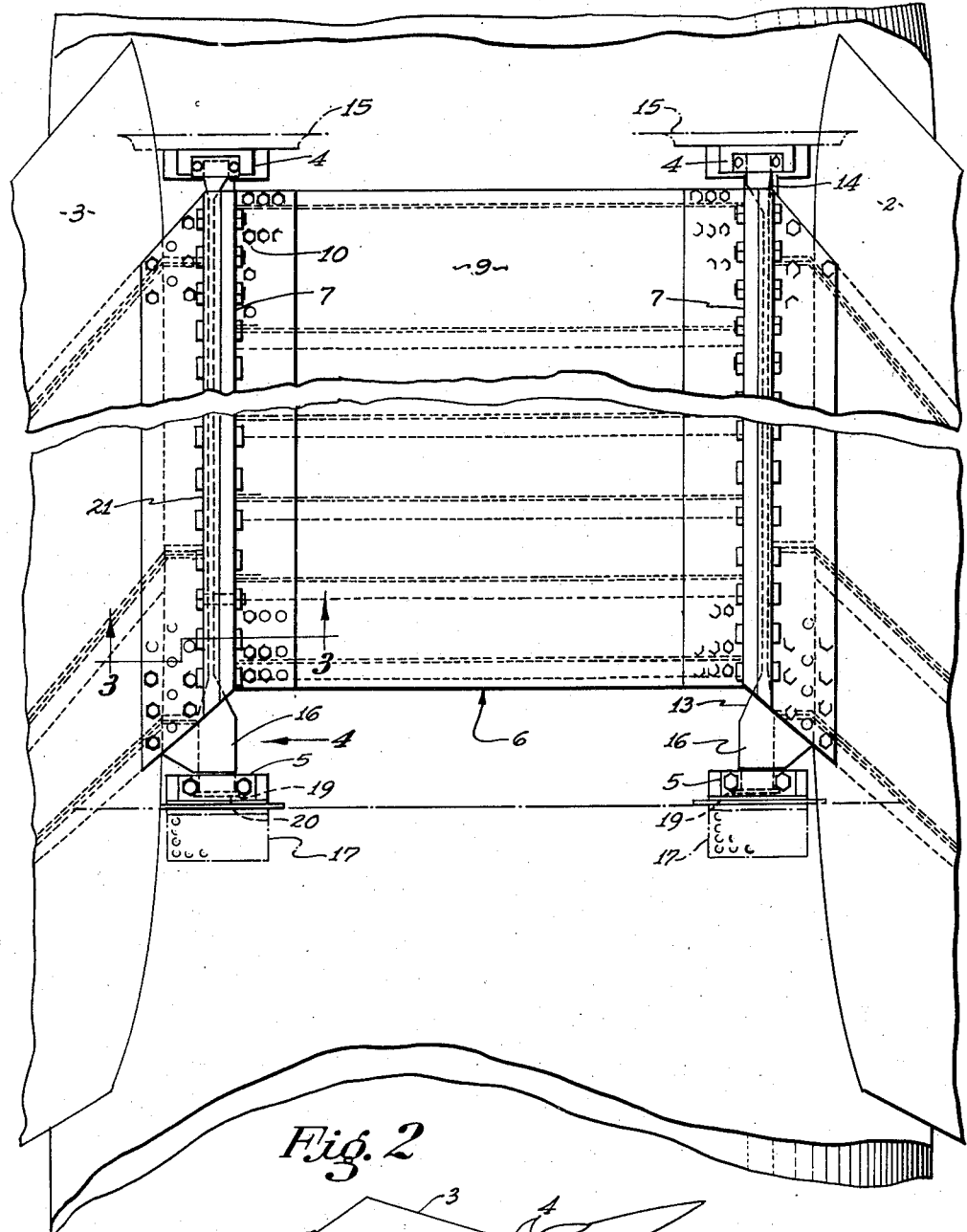
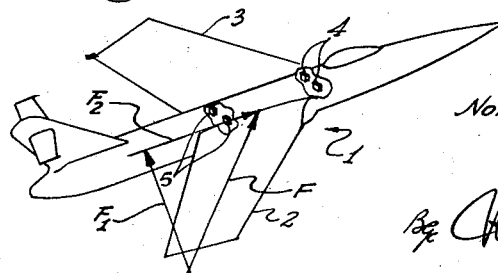
INVENTOR:
Norman B. Christensen
By Herbert E. Metcalf
His Patent Attorney June 10, 1958  N. B. CHRISTENSEN  2,838,260
WING MOUNT WITH FLOATING CENTER SECTION
Filed Aug. 6, 1953  2 Sheets-Sheet 2
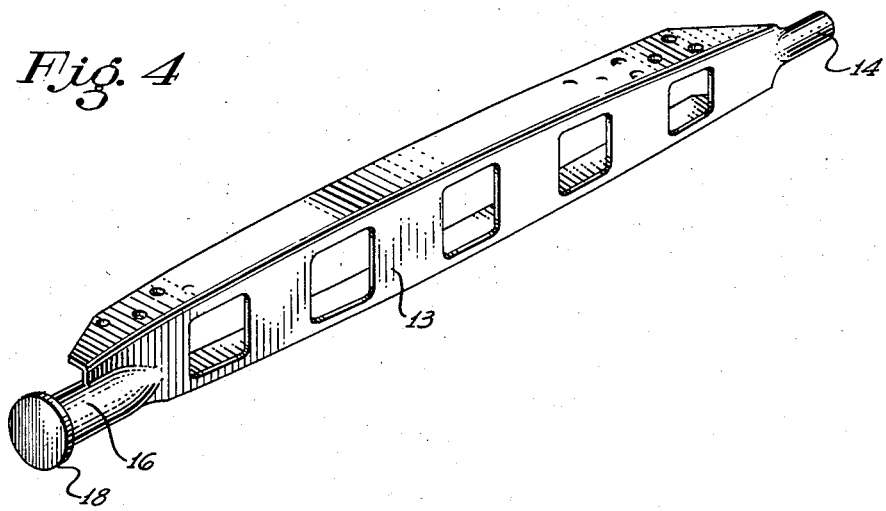
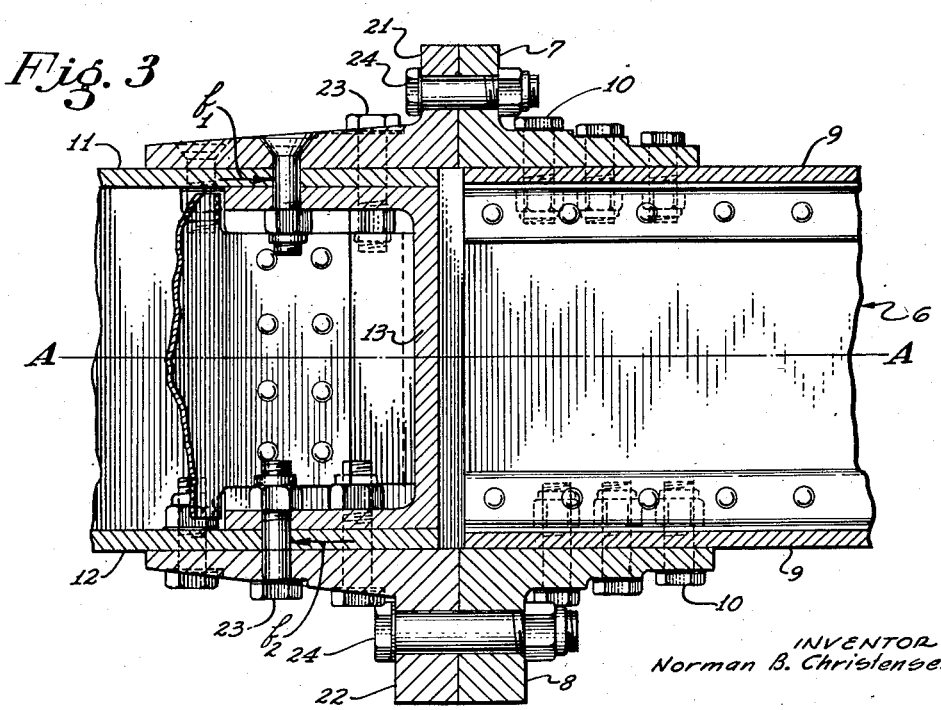
INVENTOR:
Norman B. Christensen
By Herbert E. Metcalf
His Patent Attorney United States Patent Office 2,838,260
Patented June 10, 1958

2,838,260

WING MOUNT WITH FLOATING CENTER SECTION

Norman B. Christensen, Inglewood, Calif., assignor to Northrop Aircraft, Inc., Hawthorne, Calif., a corporation of California Application August 6, 1953, Serial No. 372,643

2 Claims. (Cl. 244—117)

This invention relates generally to aircraft structures and more particularly to a wing assembly including novel structure for attaching the wing assembly to an airplane or the like.

In an airplane of conventional construction the majority of the bending stress, resulting from aerodynamic or other forces acting on the outer wings, is transferred to the central portion of the wing assembly where it is resisted. This is the case regardless of whether spar members of the wing assembly are continuous or the assembly is constructed of a plurality of panels including a center section. In resisting the aforementioned bending stress the center wing section will be deflected from its normal configuration. Inasmuch as the center section (in conventional construction) is rigidly attached to structural members of the plane these structural members are subjected to secondary loads and deflections as a result of the aforementioned forces acting on the outer wings. Continuous or repeated deformation of the plane's structure materially weakens it and therefore increases its possibility of failure.

Accordingly it is an object of the instant invention to provide a wing assembly for an airplane including a floating center section. The center section of the above wing assembly being attached to the fuselage of the airplane in such a manner that as it deflects, in resisting forces transferred thereto by the outer wing panels, structural members of the fuselage will be deflected a minimum amount.

For aerodynamic reasons the wings of most high speed aircraft are sweptback. If the outer panels of such a wing assembly are rigidly attached to a center section thereof in a conventional manner the center section will be subjected to torsional as well as bending stress. Under similar aerodynamic conditions the torsional stress introduced into the center section is directly proportional to the amount the outer wing panels are sweptback. In the case of a forty-five degree (45°) sweptback wing the moment subjecting the center section of the wing to torsional stress will be equal the moment subjecting it to bending stress. If the center section of the wing can be relieved of either of these stresses it may be reduced in size which in turn will affect the overall weight of the plane. In view of the above it is another object of this invention to provide means for attaching the outer wing panels of a wing assembly to the center section in such a manner that forces, which would normally subject the center section to torsional stress, are transferred to structural members of the plane before they act on or are transferred to the center section.

Briefly the present invention discloses means for attaching a wing assembly to a plane so that each outer wing panel is supported at two points about which they may deflect. The axes about which the wing panels deflect being in parallel spaced relation with respect to each other and the longitudinal axis of symmetry of the airplane. Located between the inboard ends of the outer wing panels is a floating center section which resists bending forces introduced therein as a result of forces acting on the outer wing panels. The points about which the wings deflect are provided by two elongated members the end portions of which are formed as bearings, one of the members being positioned within the airfoil section of each outer wing panel adjacent its inboard end. As positioned the bearings extend from the leading and trailing edges of the wing panels and are supported by bearing blocks attached to structural members of the plane. The manner in which the outer wing panels are attached to the elongated members to direct forces acting on the outer wing panels, which if transferred to the center section would introduce torsional stress therein, to the aforementioned elongated members and in turn to the bearing blocks will become apparent as the disclosure progresses.

The aforementioned objects of the instant invention will become more apparent from the following description and drawings in which like reference characters denote like parts throughout the several views. It is to be expressly understood, however, that the drawings are for the purpose of illustration only and not a definition of the limits of the invention, reference being had for this purpose to the appended claims.

In the drawings:

Figure 1 is a perspective view of an airplane having laterally extending wings attached to the plane's airframe structure by mounting means as disclosed in the present invention.

Figure 2 is an enlarged fragmentary plan view of the airplane shown in Figure 1, in this view outer portions of the airplane have been broken away to better show the construction and arrangement of the wing mounting means.

Figure 3 is a sectional view of the wing mounting means shown in Figure 2, taken on the line 3—3 thereof.

Figure 4 is a perspective view of the wing mounting member shown in Figure 2, viewed from a position indicated by arrow 4.

Referring to the accompanying drawings, Figure 1 shows an airplane 1 having sweptback cantilever type wing panels 2 and 3, each wing panel being attached to structural members of the plane's fuselage by means of fore and aft bearing blocks 4 and 5, respectively. The bearing blocks supporting each wing panel are located equal lateral distances on each side of the longitudinal axis of symmetry of the airplane. Accordingly the bearing blocks 4 and 5, located on the same side of the longitudinal axis of symmetry of the airplane, have a common axis parallel with but spaced from the longitudinal axis of the plane.

Each wing panel terminates adjacent the plane's fuselage, as best seen in Figure 2; however, they are not attached to the fuselage structure except by the aforementioned bearing blocks. Extending between the root portion of each wing panel is a central wing section 6 of box type construction having generally parallel sides and the central section is of more or less the same cross section as the wing panels at their inboard ends. The central section is not directly attached to the fuselage structure but to the root portion of the wing panels by means of upper and lower attach angles 7 and 8, respectively, and are secured to plate members 9 of the central section by means of bolts 10. Positioned between the upper and lower skin 11 and 12, respectively, of the wing panels and extending fore and aft of the leading and trailing edges thereof is a wing mounting member 13. The member 13 is channel shaped in cross section and is contoured lengthwise to mate or contact the inner surfaces of skin 11 and 12 as shown in Figures 3 and 4. The portion of each wing mounting member extending beyond the leading and trailing edges of the wing panels provide trunnions 14 and 16, respectively, which are supported in the bearings blocks 4 and 5. The forward trunnion 14 of each wing mounting member is cylindrical and is supported in a conventional manner in the forward bearing blocks which in turn are secured to airframe members 15 of the fuselage by bolts or rivets. The aft trunnions 16 are supported in the aft bearing blocks which in turn are secured to airframe members 17 of the fuselage. The aft trunnions are circular in cross section but are provided with an annular thrust ring 18 extending from their surfaces adjacent their outer ends. In the assembled position of members 13 the rings 18 are positioned in annular grooves 19 provided in the bearing blocks 5. The end surfaces of trunnions 16 contact surfaces 20 of the aft bearing blocks to provide a thrust surface. Fore and aft loads are transmitted between the wing panels and plane by means of the rings 18 and surfaces 20, further the wing panels are maintained longitudinally with respect to the plane by the thrust rings 18.

Contacting the upper and lower outer surface of the skin 11 and 12 of the wing panels are attach angles 21 and 22, respectively. These attach angles are secured to the wing panels skin and wing mounting members 13 by means of bolts 23. Leg portions of attach angles 7, 8, 21 and 22, extend at right angles to the plate members 9. The above leg portions contact each other in their assembled position and are secured together by means of bolts 24.

Thus it is seen the plane's outer wing panels and the central section are secured together to form a wing assembly of rigid construction supported at four points by trunnions 14 and 16.

The advantages of attaching a wing assembly to an aircraft as disclosed herein will become more apparent from the following in which the resulting action of aerodynamic forces acting on one of the outer wing panels of the plane 1 will be discussed. For purposes of illustration it is assumed that a resultant aerodynamic force F is acting on the wing 2 as shown in Figure 1. It is to be understood that similar forces are also acting on the wing panel 3. This resultant force F may be resolved into two forces $F_1$ and $F_2$, these latter forces act normal and parallel, respectively, to the longitudinal axis of symmetry of the plane 1.

The force $F_1$ tends to flex the wing panel 2 about the common axis of trunnions 14 and 16. This force ($F_1$) is transmitted through the stressed skin 11 and 12 to the attach angles 21 and 22, and element 13 as indicated in Figure 3 by the arrows $f_1$ and $f_2$. The force $F_1$ is in turn transmitted to and resisted by the central section 6. If the force $F_1$ tends to deflect the wing 2 upwardly, as viewed in Figures 1 and 3, that portion of the center section above neutral axis A—A will be placed in compression while that portion below axis A—A will be placed in tension and the section will accordingly deflect from its normal configuration in direct proportion to the magnitude of the force $F_1$. However, the lateral length of elements of the center section 6 located in a horizontal plane mid-way between the skin surfaces 9 and containing the neutral axis A—A, will be increased or decreased in a minimum amount due to the deflection of the center section. This is due to the fact that the axes of all of the trunions 14 and 16 are located in the horizontal plane containing the neutral axis A—A. It will also be apparent that an absolute minimum of deflection will be induced in the structural members of the fuselage in view of the above structural arrangement.

The force $F_2$ (in conventional construction) would be transferred to the center section of the wing assembly and subject it to torsional stress. Accordingly it would be necessary to design the center section to resist this torsional stress. In the instant invention the force $F_2$ is removed from the wing assembly before it reaches the center section. This force is transmitted by the stressed skins 11 and 12 and bolts 23 to the attach angles 21 and 22 and member 13 in a similar manner as indicated by arrows $f_1$ and $f_2$ in connection with the force $F_1$. These forces, however, act in a longitudinal direction with respect to member 13 and are transferred to trunnions 14 and 16 and in turn to bearings blocks 4 and 5. Accordingly, in the embodiment as disclosed, the center section is free of torsional stress to which it would normally be subjected. Inasmuch as the center section 6 is not subjected to torsional stress it may be of lighter construction which in turn will be reflected in the overall weight of the plane with which it is associated.

While in order to comply with the statutes the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. In an aircraft the combination comprising: right and left outer wing panels of similar configuration and each having inboard and outboard ends; a center section having upper and lower surfaces which are spaced with respect to each other and which have a generally parallel relationship; the inboard ends of said right and left wing panels being rigidly attached to opposite ends of said center section to provide a wing structure; first and second elongated members each including axially aligned cylindrical ends; said first elongated member being fixedly attached to the inboard end of said right wing panel with the cylindrical ends thereof positioned respectively adjacent the leading and trailing edges of said right wing panel and the axes of the cylindrical ends thereof being located midway between said upper and lower surfaces; said second elongated member being fixedly attached to the inboard end of said left wing panel with the cylindrical ends thereof positioned respectively adjacent the leading and trailing edges of said left wing panel and the axis of the cylindrical ends thereof being located midway between said upper and lower surfaces; first and second sets of bearing supports respectively mounted on the cylindrical ends of said first and second elongated members; said first set of bearing supports being fixedly secured to structural members of said aircraft with the axes thereof located at equal distances on one side of the longitudinal axis of symmetry of said aircraft and said second set of bearing supports being fixedly secured to structural members of said aircraft with the axes thereof also located at equal distances on the other side of said longitudinal axis.

2. In an aircraft the combination comprising: a rigid wing structure including outer portions and a center portion the latter portion having spaced upper and lower surfaces extending in parallel relationship; said wing structure being symmetrically constructed with respect to the longitudinal axis of symmetry of said aircraft; a first elongated member fixedly attached to said wing structure at a predetermined distance on one side of said longitudinal axis; a second elongated member fixedly attached to said wing structure at a distance equal to said predetermined distance on the opposite side of said longitudinal axis; said first and second elongated members include cylindrical ends located adjacent the leading and trailing edges of said wing structure and which constitute first and second trunnion supports for said wing structure; the axis of the cylindrical ends defining said first and second trunnion supports are located midway between said upper and lower surfaces and have a parallel relation with respect to said longitudinal axis; first and second sets of bearing supports respectively mounted on said first and second trunnion supports; said first set of bearing supports being fixedly secure to structural members of said aircraft with the axes thereof located at equal distances on one side of said longitudinal axis and said second set of bearing supports being fixedly secured to structural members of said aircraft with the axes thereof also located at equal distances on the other side of said longitudinal axis.

References Cited in the file of this patent

UNITED STATES PATENTS

| | | |
|---|---|---|
| 2,469,591 | Buttler | May 10, 1949 |

FOREIGN PATENTS

| | | |
|---|---|---|
| 25,720 | Denmark | Mar. 22, 1920 |
| 375,733 | Great Britain | June 30, 1932 |
| 557,729 | Great Britain | Dec. 2, 1943 |